United States Patent [19]
Shishido et al.
[11] Patent Number: 4,998,282
[45] Date of Patent: Mar. 5, 1991

[54] LIFESAVING BORESCOPE SYSTEM

[75] Inventors: Yoshio Shishido, Sagamihara; Yutaka Yoshida, Hachioji, both of Japan
[73] Assignee: Olympus Optical Co., Ltd., Tokyo, Japan

[21] Appl. No.: 260,876
[22] Filed: Oct. 21, 1988
[30] Foreign Application Priority Data

| | | | |
|---|---|---|---|
| Dec. 9, 1987 | [JP] | Japan | 62-311267 |
| Dec. 9, 1987 | [JP] | Japan | 62-311268 |
| Dec. 9, 1987 | [JP] | Japan | 62-311269 |
| Dec. 9, 1987 | [JP] | Japan | 62-187586[U] |
| Dec. 9, 1987 | [JP] | Japan | 62-187587[U] |

[51] Int. Cl.[5] .......... H04B 3/00
[52] U.S. Cl. .......... 381/77; 381/67; 381/124; 128/4
[58] Field of Search .......... 128/4, 6, 305; 381/77, 381/67, 124; 604/22

[56] References Cited
U.S. PATENT DOCUMENTS

| | | | |
|---|---|---|---|
| 4,503,865 | 3/1985 | Shishido . | |
| 4,581,727 | 4/1986 | Harper et al. | 367/140 |
| 4,589,414 | 5/1986 | Yoshida et al. . | |
| 4,710,710 | 12/1987 | Flora et al. | 73/866.5 |
| 4,793,326 | 12/1988 | Shishido | 128/4 |
| 4,807,596 | 2/1989 | Hochberger et al. | 128/4 |

*Primary Examiner*—Forester W. Isen
*Attorney, Agent, or Firm*—Frishauf, Holtz, Goodman & Woodward

[57] ABSTRACT

A lifesaving borescope system comprises a borescope having an insertion section, sensors disposed in the vicinity of the distal end portion of the insertion section, a sensor holder for holding the sensors, and an external output device for displaying or pronouncing information detected by the sensors.

13 Claims, 14 Drawing Sheets

LIFESAVING BORESCOPE SYSTEM

BACKGROUND OF THE INVENTION

1. Field of the Invention

The present invention relates to a borescope system which is used to ascertain the survival of victims and determine the ambient temperature, presence or amount of gas, etc. in isolated spaces to which the victims are confined due to collapse of houses or landslides caused by man-made accidents or natural calamities, such as storm or flood disasters or earthquakes. 2. Description of the Related Art If houses are collapsed or a landslide is caused by a man-made accident or a natural calamity, such as a storm or flood disaster or an earthquake, so that some people are confined to a space isolated from the outside, the victims must be rescued speedily and properly. In doing this, it is very important to ascertain the survival of the victims in advance and exactly get the bearings of the situation.

In most cases, it is hard to externally identify a victim who is confined to a collapsed house, and his or her loudest shout often cannot be heard from the outside. If the victim is left in the house for a long period of time, he or she may possibly die from oxygen starvation, fatigue, or hunger.

Nevertheless, no apparatuses have yet been provided to ascertain the survival of victims or detect the conditions of such confinement.

SUMMARY OF THE INVENTION

The object of the present invention is to provide a borescope system which can ascertain the survival of victims, detect the conditions of circumstances to which the victims are confined, and give appropriate medical treatment to survivors, if any.

The above object of the invention can be achieved by a borescope system constructed as follows. The borescope system comprises a borescope having an insertion, section, sensors disposed in the vicinity of the distal end portion of the insertion section, a sensor holder for holding the sensors, and an external output device for displaying or pronouncing information detected by the sensors.

According to the borescope system of the invention, the various sensors, which are disposed near the distal end portion of the borescope, are used to detect signals, such as temperature and sound indicative of the presence of survivors, and the conditions of the space to which the victims are confined. The detected information can be displayed or pronounced by means of the external output device.

Accordingly, operators engaged in relief work can easily accurately ascertain the survival of the victims and know the conditions of the place of confinement, whereupon they can give appropriate medical treatment to survivors, thus enjoying improved efficiency of life-saving operations.

BRIEF DESCRIPTION OF THE DRAWINGS

FIG. 22 is a cutaway side view showing a rotatory force generator of a borescope system according to a fifth embodiment of the invention; and FIG. 23 is a front view of a distal excavation tip shown in FIG. 22.

DETAILED DESCRIPTION OF THE PREFERRED EMBODIMENTS

Figure 1:
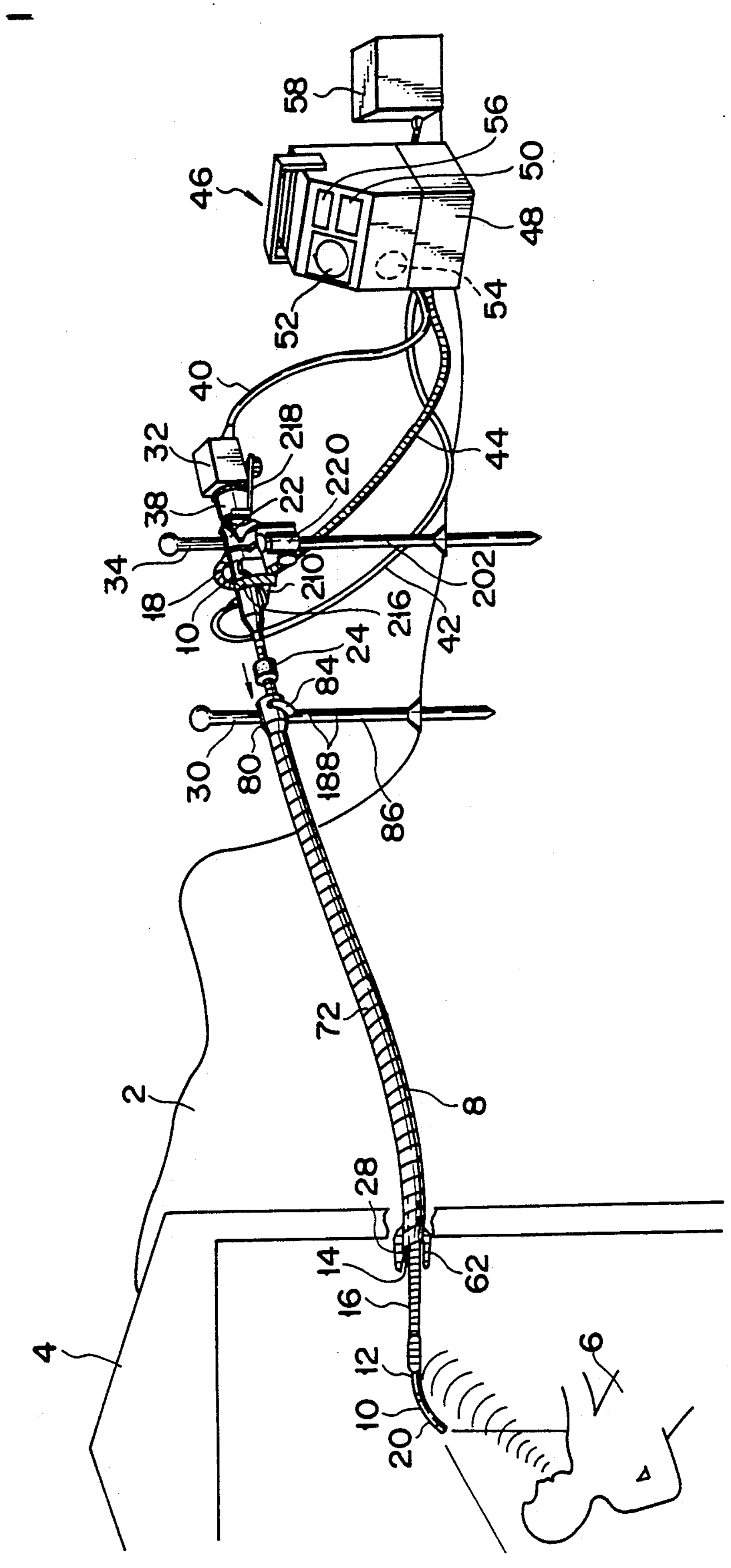
FIG. 1 is a perspective view showing the general arrangement of a borescope system according to a first embodiment of the present invention.

FIGS. 1 to 11 show a first embodiment of the present invention. Referring to FIG. 1, there is shown a situation in which a borescope system according to the first embodiment is used to rescue victim 6 in house 4 buried under landslide 2 due to a heavy rainfall. In this case, exits of house 4 are entirely blocked so that victim 6 cannot get out of the house.

Boring guide tube 8 is introduced into house 4 under landslide 2. Defined in tube 8 is insertion passage 14 through which insertion section 12 of borescope 10 is passed with the aid of guide tube 16 with sensors. Thus, in inserting borescope 10, tube 16 is fitted on insertion section 12. Insertion section 12 of borescope 10 is introduced into house 4 by means of tube 16 which is inserted in passage 14 of boring guide tube 8. Manual control section 18 of borescope 10 is provided with angle knob 22 which is used to bend bending portion 20 of insertion section 12.

Guide tube 16 with sensors can hold various sensors. Soft rubber seal 24 is attached to the proximal end portion of tube 16. It serves to close a proximal opening portion of passage 14 of tube 8.

Figure 4:
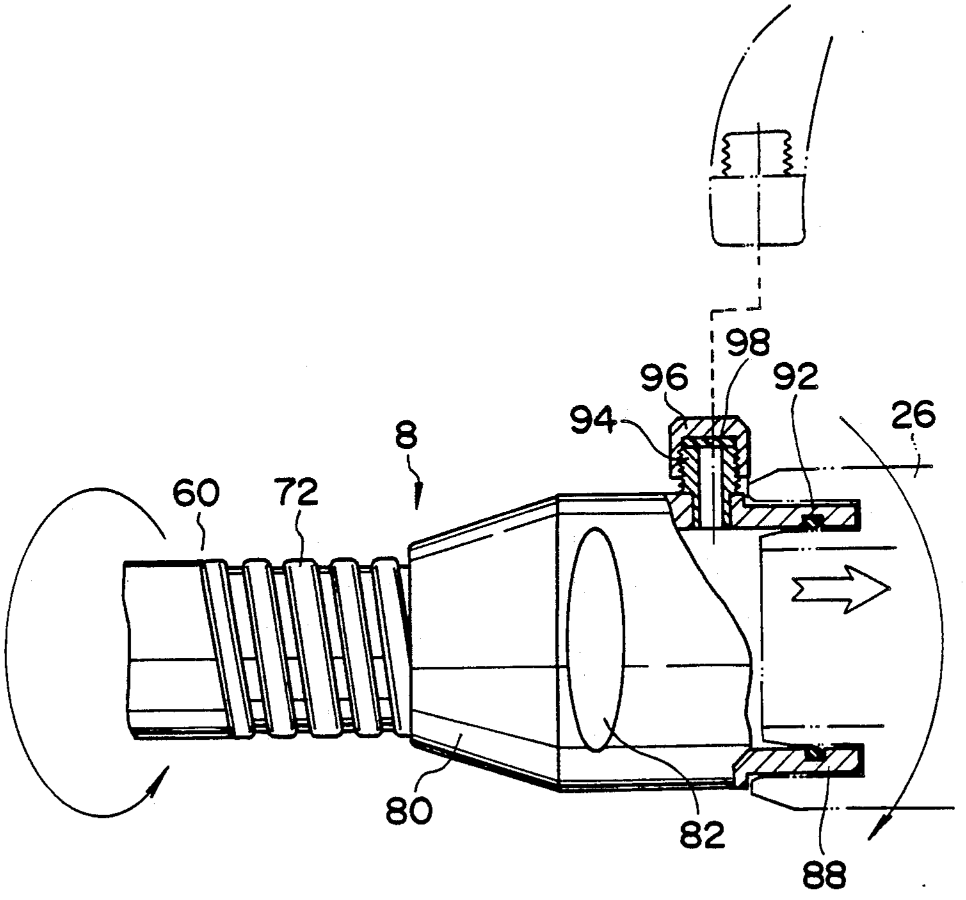
FIG. 4 is a partial sectional view of the proximal end portion of the boring tube assembly according to the first embodiment.
Figure 5:
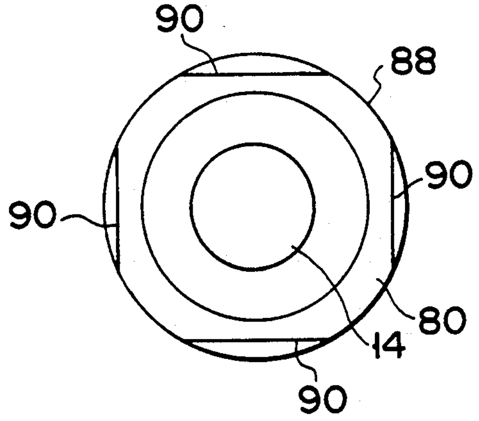
FIG. 5 is a rear view of a coupling portion shown in FIG. 4.

Boring guide tube 8 is coupled to rotatory force transmission device 26 shown in FIG. 4, to be rotated thereby. As tube 8 rotates, a plurality of edges 28, which are attached to the distal end of tube 8, can advance digging landslide 2. The rear end portion of tube 8 is supported by means of first post 30.

When operating the system without holding borescope 10 directly by hand or when using TV camera 32 or the like, second post 34 is used to support borescope 10 and/or camera 32. Camera 32 is mounted, by means of camera adapter 38, on eyepiece portion 36 (FIG. 12) provided at manual control section 18 of borescope 10. Cord 40 extends from TV camera 32.

Cable 42 for sensor signal transmission extends from the proximal end portion of guide tube 16 with sensors, while light guide cable 44 extends from manual control section 18 of borescope 10.

Cord 40, sensor signal transmission cable 42, and light guide cable 44 are connected to portable video unit 46. Video unit 46 incorporates light source 48 for illumination, video cassette recorder 50, TV monitor 52, and speaker 54. These elements can be operated and adjusted by means of control panel section 56. Panel section 56 is provided with various function keys, which can be operated by light touches. Portable dynamo 58 is used as a power source for component video unit 46. Gasoline or light oil may be used as fuel for dynamo 58.

Figure 2:
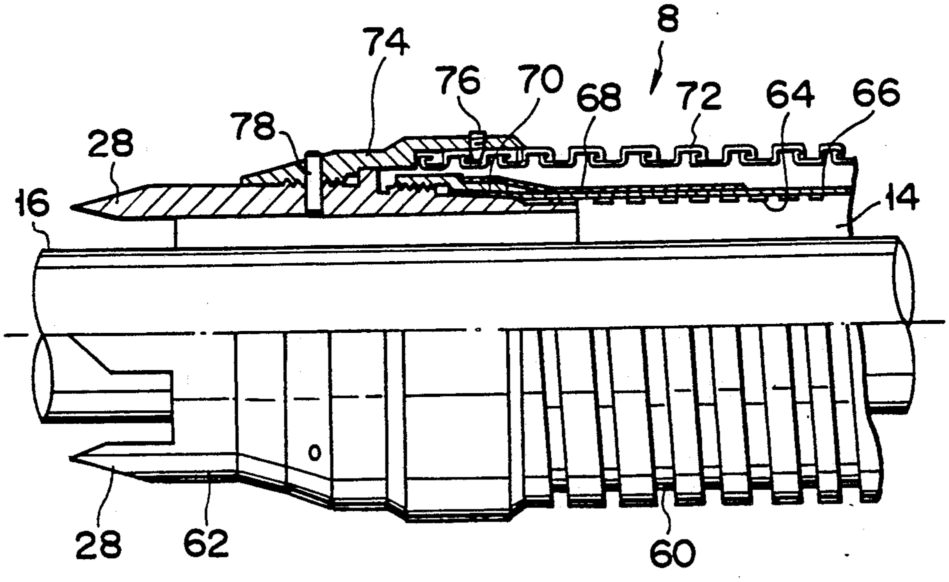
FIG. 2 is a partial sectional view of the distal end portion of a boring tube assembly according to the first embodiment.
Figure 3:
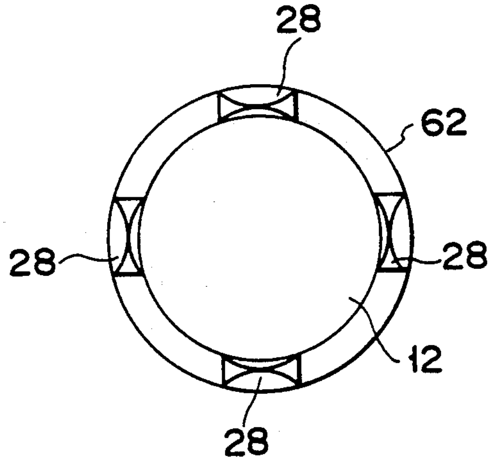
FIG. 3 is a front view of a distal excavation tip shown in FIG. 2.

The following is a detailed description of the individual sections of the system. Referring first to FIGS. 2 to 5, the construction of boring guide tube 8 will be described. Distal excavation tip 62, formed of a rigid cylindrical member, is fixed to the distal end of flexible tube body 60. As shown in FIG. 3, edges 28 are formed at the distal end of tip 62. As shown in FIG. 2, tube body 60 is composed of metallic coil 64, plastic waterproof tube 66 fitted thereon, and cylindrical blade 68 of knitted stainless-steel wire covering the outer peripheral surface of tube 66. Waterproof tube 66, coil 64, and blade 68 serve to keep tube body 60 watertight. The distal end portions of coil 64 and tube 66 of tube body 60 are fixedly mounted on the outer periphery of the rear end of distal excavation tip 62. The distal end portion of tube 66, in particular, is pressed against a taper portion on the outer peripheral surface of the rear end of tip 62, by means of pressure fitting 70. Fitting 70 is screwed on the rear end of tip 62. The distal end of blade 68 is fixed to the outer peripheral surface of pressure fitting 70 by soldering or by means of a bonding agent.

Metallic spiral tube 72 is loosely fitted on tube body 60. It is strong enough to transmit the rotatory force. The distal end of tube 72 is coupled to cover 74 which is screwed on distal excavation tip 62. Spiral tube 72 can be axially extended or contracted for a fixed length. Tube 72 and cover 74 are soldered and fixed to each other by means of setscrews 76 for preventing the axial rotation after being adjusted in axial position. Also, cover 74 is fixed to excavation tip 62 by means of a plurality of retaining pins 78. As shown in FIG. 4, rear connector 80 is integrally fixed to the rear end portion of spiral tube 72, whereby the rotatory force can be transmitted. A pair of engaging recesses 82 are formed on the outer surface of connector 80 so as to be diametrically opposite to each other. Recesses 82 are adapted to be engaged with hook 84 and post shaft 86 of first post 30 shown in FIG. 8, whereby connector 80 is supported between hook 84 and shaft 86 so as to be nonrotatable. Coupling portion 88 for engagement with rotatory force transmission device 26 is formed around the rear end portion of rear connector 80. The coupling portion includes two pairs of opposite flat surfaces 90 formed at angular intervals of 90° on the outer peripheral surface of the rear end portion of connector 80.

O-ring 92 is provided on the inner peripheral surface of the rear end portion of rear connector 80. It serves to keep the gap at the junction watertight when a coupling end portion of rotatory force transmission device 26 is coupled to connector 80. Washing mouthpiece 94 is provided on the peripheral surface of the rear end portion of connector 80. It communicates with passage 14 of boring guide tube 8. The washing mouthpiece serves as an inlet/outlet port for gas feed, water feed, or sectional discharge when guide tube 16 with sensors or insertion section 12 of borescope 10 is passed through guide tube 8. Mouthpiece 94 can also be utilized in sucking and examining gas in an atmosphere at the distal end portion. When mouthpiece 94 need not be used, cap 96 is removably screwed thereon with the aid of packing 98 for watertight sealing.

Figure 6:
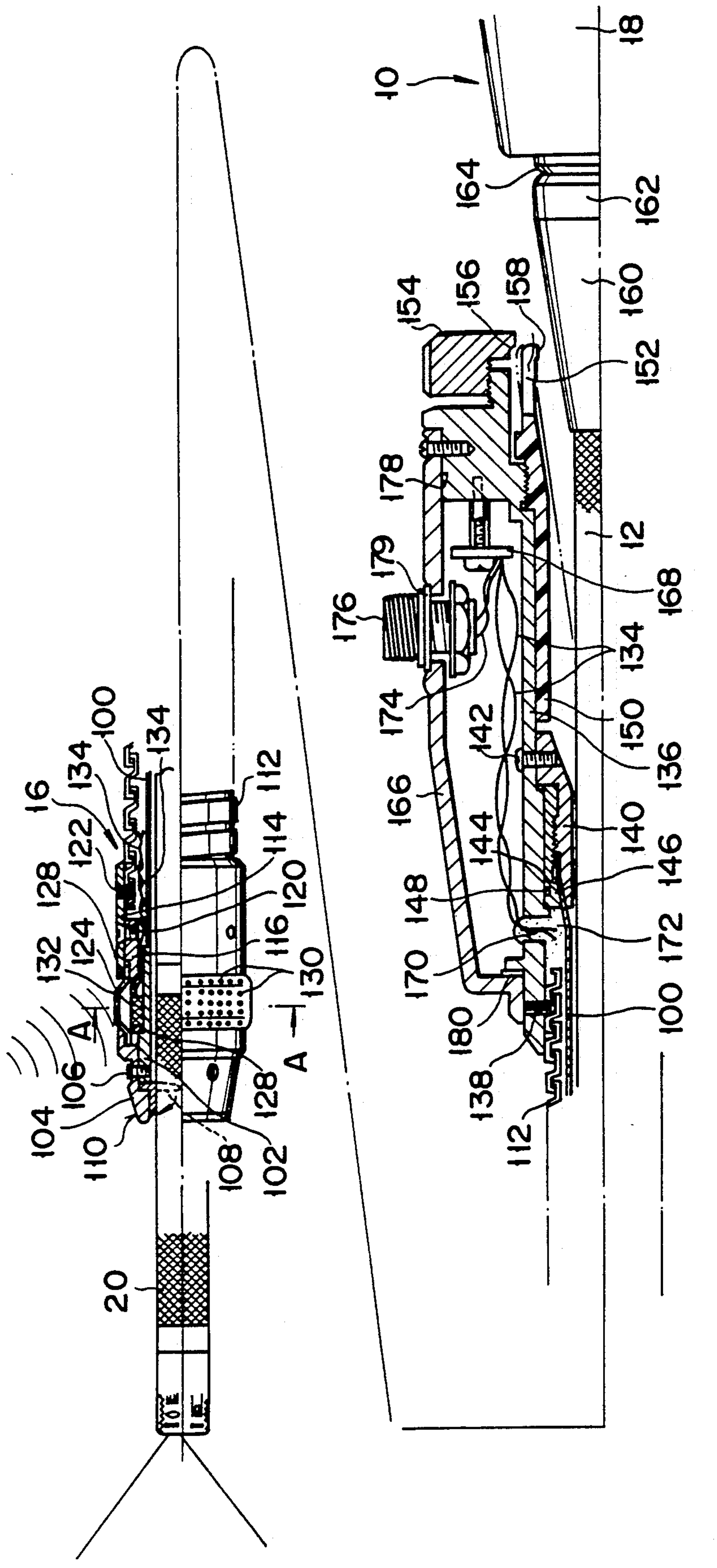
FIG. 6 is a partial sectional view schematically showing an insertion section and a guide tube of a borescope according to the first embodiment.
Figure 7:
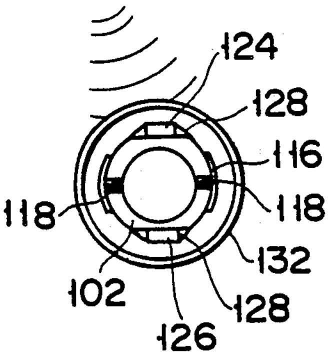
FIG. 7 is a cross-sectional view taken along line A—A of FIG. 6.

FIGS. 6 and 7 show guide tube 16 with sensors for guiding insertion section 12 of borescope 10. In tube 16, distal end body 102, in the form of a rigid cylindrical member, is fixed to the distal end of flexible tube member 100. Ring-shaped distal end fitting 104 is fixedly fitted on the distal end of body 102 by means of setscrews 106. Dirt-proof plug 108, formed of a slitted rubber film, is interposed between the distal end of distal end body 102 and fitting 104. As shown in FIG. 6, insertion section 12 of borescope 10 can be passed through plug 108. When insertion section 12 is inserted into guide tube 16 to a position just short of plug 108, the plug is shifted to the position indicated by broken line in FIG. 6, so that dirt is prevented from penetrating the distal end portion from the outside. Thus, optical lenses of optical systems for illumination and observation, which are arranged at insertion section 12 of borescope 10, can be protected from soiling. The outer peripheral surface of the distal end of distal end fitting 104, which is attached to the distal end portion of distal end body 102, is tapered, thus forming insertion guide surface 110.

Flexible spiral tube 112, which can be axially extended or contracted for a fixed length, is loosely fitted on tube member 100 of guide tube 16 with sensors. The distal end of tube 112 is connected, by means of coupling ring 114, to connectors 116 which are fixed to distal end body 102. As shown in FIG. 7, connectors 116 are fixed to the rear end portion of body 102 by means of screws 118. Coupling ring 114 is fixed to connectors 116 by means of setscrews 120, e.g., flush screws. The distal end of spiral tube 112 is fixed to ring 114 by means of setscrews 122.

As shown in FIGS. 6 and 7, moreover, various sensors, e.g., microphone 124 and temperature sensor 126, are mounted in that portion of a space around distal end body 102 which is situated between distal end fitting 104 and connectors 116. Microphone 124 and sensor 126 are fixed by means of electrically insulating, adhesive seal material 128. The space in which microphone 124 and sensor 126 are mounted is covered by thin protective film 132 which is constructed so as to be permeable to heat and sound. For example, film 132 has a number of pores 130. Signal transmission cords 134 for microphone 134 and temperature sensor 126 are guided to the proximal end portion through the gap between tube member 100 and spiral tube 112.

The proximal end portion of guide tube 16 with sensors are constructed as shown in FIG. 6. The proximal end portion of spiral tube 112 is fitted in the distal end portion of cylindrical rear body 136, and is fixed thereto by means of setscrews 138. Cylindrical connecting mouthpiece 140 is inserted in rear body 136, and is fixed thereto by means of setscrews 142. Taper surface portion 144 is formed on the outer peripheral surface of the distal end of mouthpiece 140. The proximal end of tube member 100 is mounted on surface portion 144, and is clamped by means of tube retainer 146. The region between the inner surface of rear body 136 and retainer 146 is sealed in a watertight manner by means of O-ring 148.

Cylindrical fixed tube 150, made of plastic material, is screwed to the inner peripheral surface of the rear end portion of rear body 136. The proximal end portion of tube 150 is slitted corresponding to four radial directions to form four engaging pieces 152. Pieces 152 have resiliency such that their ends tend to spread outward. The proximal end portion of fixed tube 150, having these engaging pieces, has a gentle slope such that insertion section 12 of borescope 10 can be easily inserted into tube 150. The inner surface of each engaging piece 152 is slanted so as to spread outward. When clamping ring 154 is screwed onto the proximal end portion of rear body 136, pieces 152 are bent inward by taper portion 156 of ring 154. Inward projection 158 is formed on the projecting end of each engaging piece 152. It is adapted to engage circumferential engaging groove 164 which is formed on support fitting 162 for fixing guard tube 160 of borescope 10.

Outer cylinder 166 is mounted in a gastight manner on the outer peripheral surface of rear body 136. Circuit board 168 is disposed in a liquid-tight space between the outer peripheral surface of body 136 and the inner peripheral surface of cylinder 166. Amplifiers for audio signals and sensor signals and other circuits are mounted on board 168. Also, signal transmission cords 134 from microphone 124 and temperature sensor 126 are connected to circuit board 168. Cords 134 are guided through aperture 170 which is bored through the wall of rear body 136. Aperture 170 is sealed by means of soft seal material 172. Cords 174 lead out from circuit board 168 are connected to sealed socket 176 which is attached to outer cylinder 166. Signal transmission cable 42 is removably connected to socket 176. Numerals 178, 179 and 180 designate packings for sealing.

Figure 8:
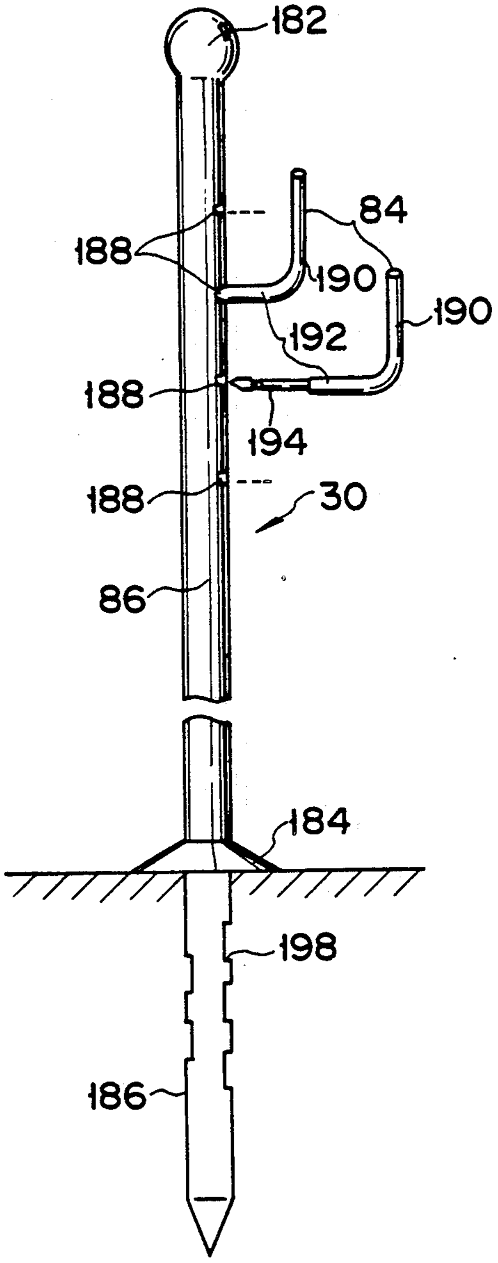
FIG. 8 is a side view of a first post for retaining the boring tube assembly.
Figure 9:
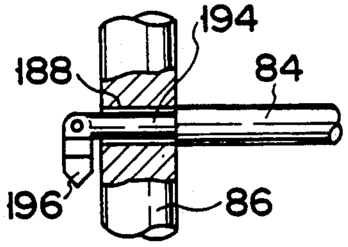
FIG. 9 is a partial sectional view showing a retaining portion of a hook shown in FIG. 8.

First post 30 is constructed as shown in FIGS. 8 and 9. Post shaft 86 has hammering portion 182 at its top end portion, ground support 184 in the middle, and thrust portion 186 extending downward from support 184. Shaft 86 has a plurality of square holes 188 arranged at regular intervals along its axial direction, at its upper portion. L-shaped hook 84, which includes rising retaining portion 190 and horizontal support portion 192, can be fitted selectively in any of holes 188. Square shaft 194, which is formed at the distal end of support portion 192, can be inserted into square hole 188 so that hook 84 is anchored to shaft 86. Stopper 196 is pivotally mounted on the distal end of shaft 194. It can prevent square shaft 194 from slipping off hole 188 when it is brought down after being passed through the hole. As shown in FIG. 8, stopper recesses 198 are formed on the outer peripheral surface of thrust portion 186. Alternatively, the thrust portion may be formed with uneven portions, e.g., trapezoidal thread 200 like the one formed on second post 34.

Figure 10:
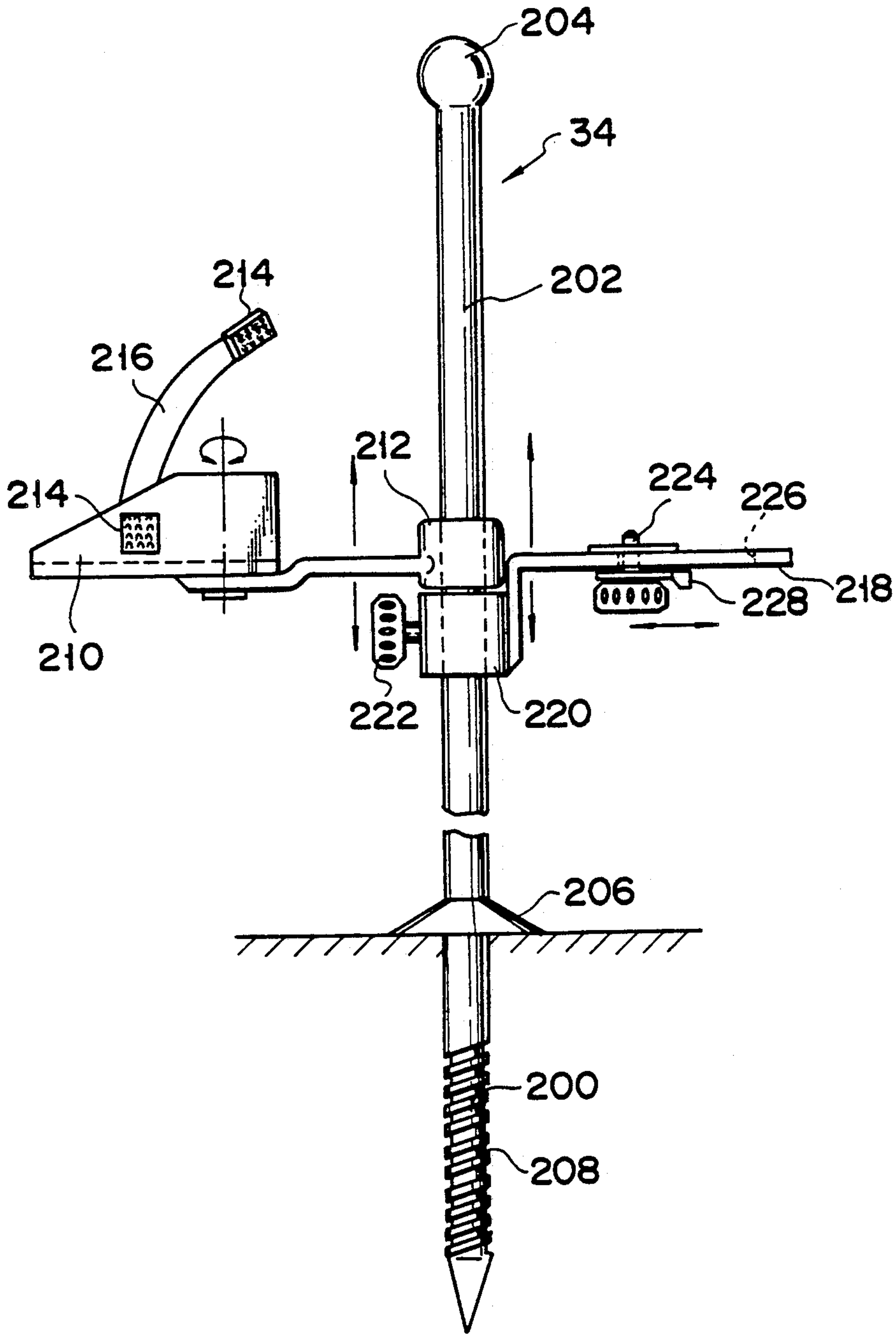
FIG. 10 is a side view of a second post for retaining a control section of the borescope.

Second post 34 is constructed as shown in FIG. 10. Post shaft 202 has hammering portion 204 at its top end portion, ground support 206 in the middle, and thrust portion 208 extending downward from support 206. Support cylinder portion 212 of borescope holder 210 is mounted on the upper portion of shaft 202 so that holder 210 is vertically movable and rotatable around shaft 202. Manual control section 18 of borescope 10 is set on borescope holder 210, and is held in position by means of fixing band 216 which has Magic Tape strip 214 at its free end.

Further, support cylinder portion 220 of camera holder 218 is mounted on that portion of post shaft 202 situated below support cylinder portion 212 of borescope holder 210. Thus, holder 218 is vertically movable and rotatable around shaft 202. Cylinder portion 220 is fitted with fixing screw 222 for clamping post shaft 202 to fix portion 220 at any desired position. Also, cylinder portion 220 supports cylinder portion 212 of borescope holder 210 which is mounted on shaft 202. Camera holder 218 is fitted with fixing screw 224 which is movable along slot 226. Screw 224 is adapted to be in threaded engagement with a female screw at the bottom portion of TV camera 32 by rotating a handle of screw 224. An observation and photographing device, e.g., TV camera 32 is fixed to camera holder 218 by fixing screw 224 and fixing lever 228 having a female screw portion. Since the position of fixing screw 224 is shiftable along slot 226, it can be adjusted to TV camera 32 of any size, despite the difference of the position of the mating female screw. When using TV camera 32 without an image forming lens, camera holder 218 may be designed in consideration of the length of camera adapter 38 or made telescopic.

The following is a description of the operation and function of the aforementioned disaster-relief borescope system. As shown in FIG. 1, house 4 is buried under landslide 2 due to a heavy rainfall, for example. In this state, exits of house 4 are entirely blocked so that victim 6 cannot get out of the house. If victim 6 is confined to the isolated house for a long period of time, he or she will grow weak from fatigue and hunger. This situation cannot be seen externally, and his or her shout cannot be heard from the outside. If left in this state, victim 6 will possibly die. In order to take an effective relief measure, therefore, it is necessary to ascertain the presence of survivors and know the conditions of the inside of the house, before such a fatal situation is caused. This probing operation must be performed quickly and accurately.

Thereupon, the disaster-relief borescope system of the present invention serves for the probing operation. First, obstacles, including landslide 2 and house 4, are dug or bored forward by means of boring guide tube 8 and rotatory force transmission device 26. More specifically, transmission device 26 is coupled to rear connector 80 of guide tube 8, with the aid of flat surfaces 90 on the outer peripheral surface of the rear end portion of connector 80. Thus, the rotatory force is transmitted from transmission device 26 to guide tube 8. As guide tube 8 rotates, edges 28 of distal excavation tip 62 advance digging or shaving the obstacles, including landslide 2 and house 4. Since guide tube 8 and transmission device 26 are coupled in a watertight manner by means of O-ring 92, landslide 2 and the like in tube 8 can be removed by suction using a vacuum attached to device 26. Since the passage in guide tube 8 serves also for gas and water feed, moreover, tube 8 can be used to supply oxygen, in case of oxygen starvation, or exclude filthy water and the like.

In this embodiment, boring guide tube 8 is integrally formed so that it can rotate in one. Alternatively, however, only distal excavation tip 62 of tube 8 may be made rotatable. The excavation tip may be rotated by means of compressed air blown out from a compressor, for example.

When the distal end of boring guide tube 8 penetrates house 4 to which victim 6 is confined, rear connector 80 of guide tube 8 is separated from rotatory force transmission device 26, and is supported by means of first post 30. More specifically, connector 80 is supported on support portion 192 of hook 84 so that its engaging recesses 82 engage post shaft 86 and retaining portion 190 of the hook. First post 30 is planted in position on the ground by hammering when the position of rear connector 80 of boring guide tube 8 is settled beforehand. The height of hook 84 can be freely changed by alternatively selecting square holes 188.

According to the present invention, as described above, boring guide tube 8 can be introduced into house 4 under landslide 2, and passage 14 for the insertion of insertion section 12 of borescope 10 is secured in guide tube 8.

After passage 14 is secured in this manner, guide tube 16 with sensors is inserted into the passage. Soft rubber seal 24 is attached to the rear end portion of tube 16 so that the rear end opening of boring guide tube 8 is closed by seal 24 after passage 14 is penetrated by tube 16. Then, insertion section 12 of borescope 10 is inserted into guide tube 16. Since the distal end of tube 16 is closed by dirt-proof plug 108, the inside of tube 16 is protected from external dirt. Since plug 108 has slits, insertion section 12 can be easily passed through the plug without soiling it.

When guide tube 16 with sensors and insertion section 12 of borescope 10 are inserted in passage 14, gas or water can be fed through washing mouthpiece 94. As mentioned before, the rear end opening of boring guide tube 8 is closed by means of soft rubber seal 24. Seal 24 may be fixed to guide tube 16. Also, gas and other substances around the distal end of guide tube 8 may be sucked through mouthpiece 94, to be examined.

Since tapered insertion guide surface 110 is formed at the distal end of guide tube 16 with sensors, tube 16 can be passed through boring guide tube 8 easily and quickly, without a hitch.

Control section 18 of borescope 10 is fixed to the rear end of guide tube 16. Guard tube 160 is inserted into cylindrical fixed tube 150 inside rear body 136. Since the inner surface of the rear end portion of tube 150 spreads rearward, tube 160 can be easily inserted along the gentle slope. Tube 160 is situated inside four engaging pieces 152 each having a slanting inner surface. When clamping ring 154 is screwed onto the proximal end portion of rear body 136, the outside diameter of the assembly of pieces 152 is reduced by taper portion 156 of ring 154. Thereupon, projections 158 on the distal end of pieces 152 engage engaging groove 164 on support fitting 162 for fixing guard tube 160. Thus, guide tube 16 with sensors and borescope 10 are fixed to each other. Tube 16 can be removed from borescope 10 by only loosening ring 154. Light guide cable 44 of borescope 10 is coupled to light source 48 for illumination, and illumination light is supplied from the light source.

Subsequently, manual control section 18 of borescope 10 is set on borescope holder 210 of second post 34, previously planted on the ground in the same manner as first post 30, and is then fixed by means of fixing band 216. Thus, the operator can operate borescope 10 for observation through eyepiece portion 36 without taking the trouble to support manual control section 18 by hand. When using TV monitor 52 for the observation, TV camera 32 is mounted on eyepiece portion 36 of borescope 10 with the aid of camera adapter 38. Camera 32 is fixed to camera holder 218 by means of fixing screw 224. A video signal obtained by means of camera 32 is transmitted to video unit 46 by means of cord 40, and a video image is displayed on monitor 52. Also, the image is recorded by means of video cassette recorder 50 of video unit 46.

Figure 11:
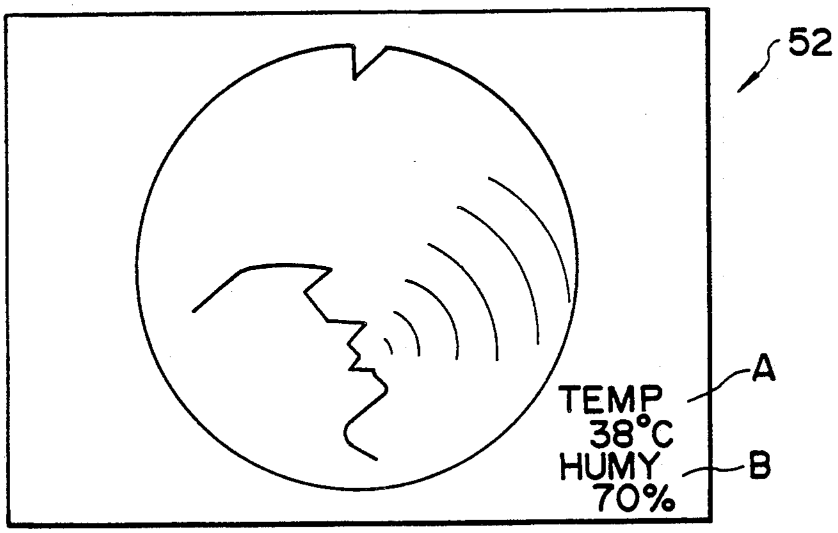
FIG. 11 is a diagram showing a picture on a TV monitor of a video unit according to the first embodiment.

Further, sound and temperature inside house 4 are detected by means of microphone 124 and temperature sensor 126 that are attached to the distal end of guide tube 16. Detection signals from microphone 124 and sensor 126 are applied, by means of cords 134, to those circuits which include the amplifiers for audio signals and sensor signals, and are processed electrically. These processed electrical signals are delivered to a detecting device (not shown) in portable video unit 46, via cords 174, socket 176, and signal transmission cable 42 connected to the socket. Voices or sounds are delivered from speaker 54, while temperature information (A) is displayed on the lower right corner portion of the screen of TV monitor 52, as shown in FIG. 11.

Thus, by the use of the disaster-relief borescope system of the present invention, the survival of victim 6 can be ascertained, and the conditions in which the victim is confined can be detected. If a subminiature speaker is built in the distal end of guide tube 16, the victim can be encouraged by being informed of the progress of relief work and the like through the speaker.

In the arrangement of the embodiment described above, only microphone 124 and temperature sensor 126 are provided as sensor means at the distal end of guide tube 16 with sensors. Instead of or in addition to these sensor means, sensors with various other functions may be attached to tube 16. These alternative or additional sensors may include a humidity sensor and gas concentration sensors for detecting oxygen, carbon dioxide, coal gas, propane gas, etc., for example. Use of these sensors provides more accurate information on the state of things. This information (B) is also displayed on the screen of TV monitor, as shown in FIG. 11.

Figure 12:
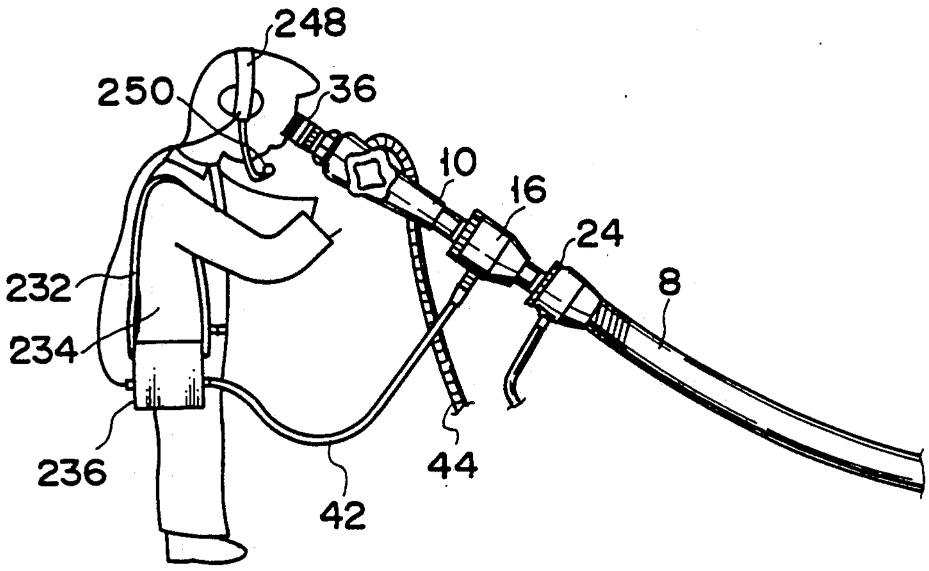
FIG. 12 is a side view of a control section of a borescope system according to a second embodiment of the invention.
Figure 13:
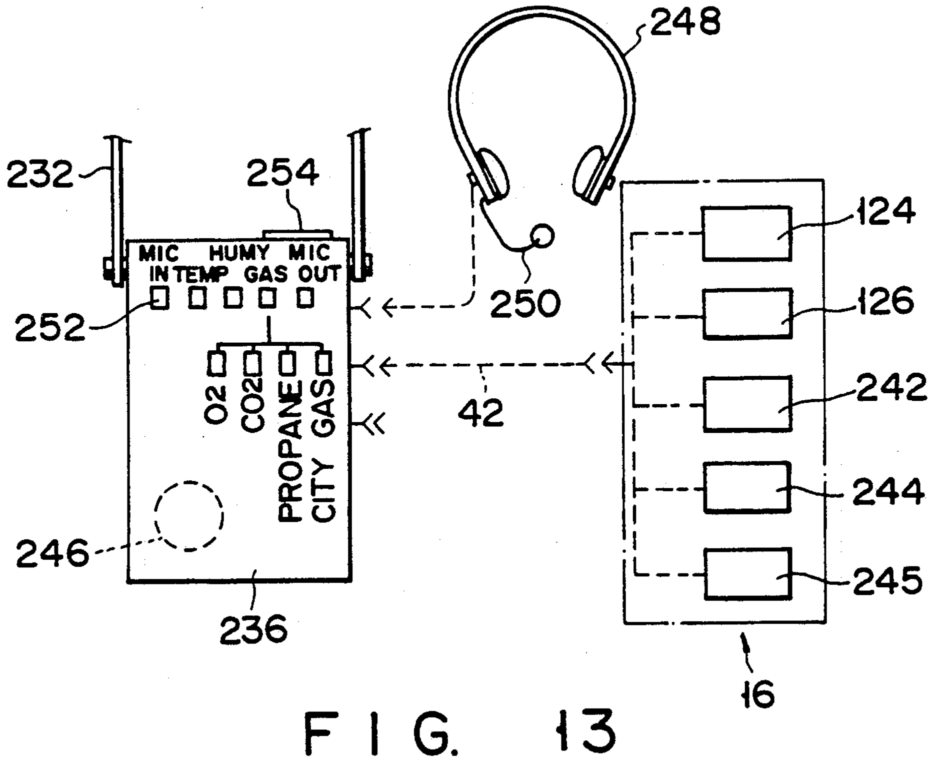
FIG. 13 is a side view schematically showing a portable alarm unit according to the second embodiment.
Figure 14:
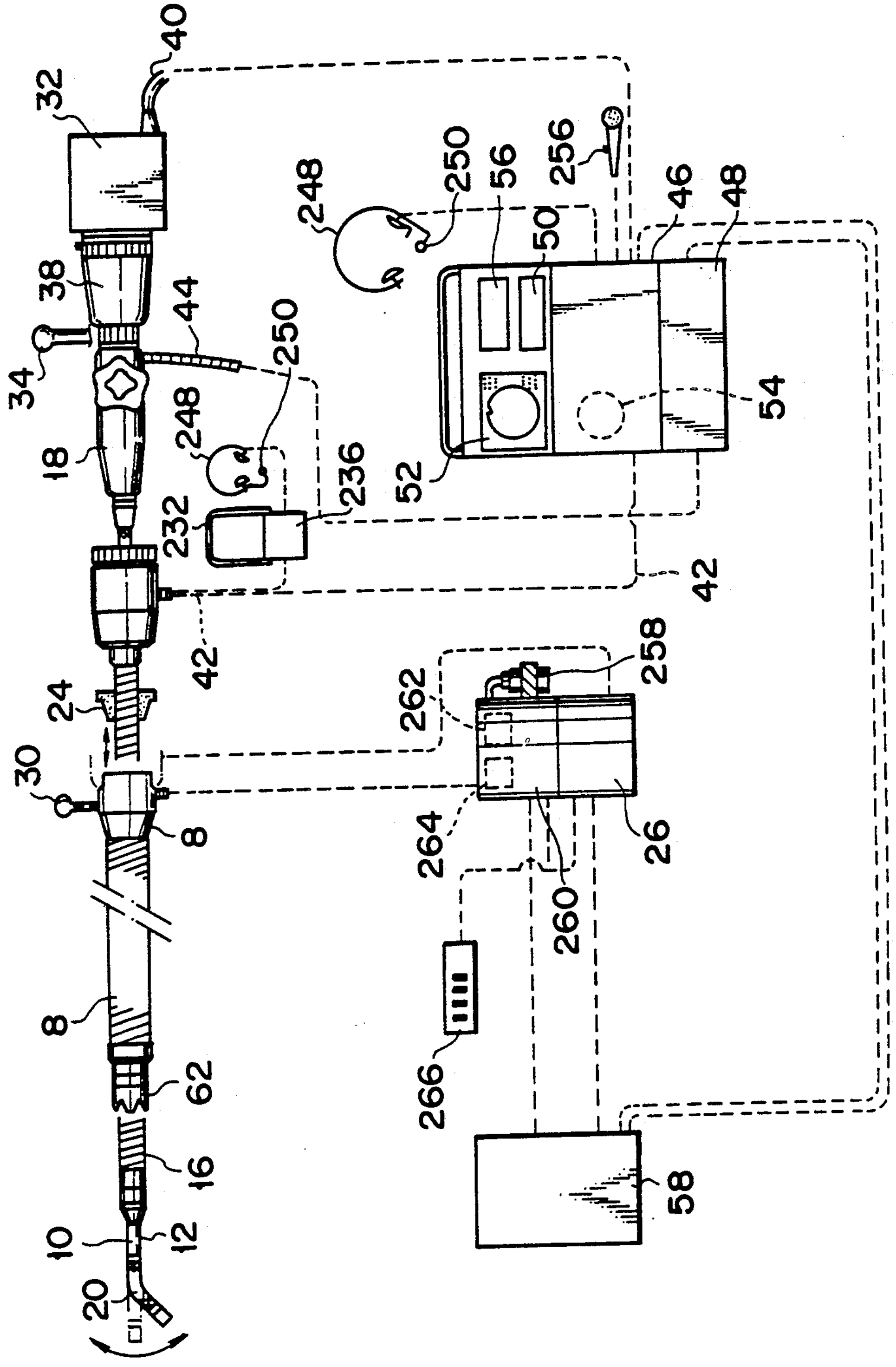
FIG. 14 is a side view schematically showing the borescope systems according to the first and second embodiments.

FIGS. 12, 13 and 14 show a second embodiment of the present invention. FIG. 14 shows the general arrangement of a borescope system according to the second embodiment. The borescope system of this embodiment is used when portable video unit 46 and its associated devices cannot be brought to the scene of a disaster. Eyepiece portion 36 of borescope 10 of this system is adapted for direct visual observation, as shown in FIG. 12. Portable alarm unit 236 is adapted to be suspended from a shoulder of operator 234 by means of belt 232. Unit 236 incorporates a processing circuit which receives detection signals from the various sensors attached to the distal end of guide tube 16, and gives alarms when values of various levels escalating toward predetermined critical values are reached. The sensors include, for example, temperature sensor 126, humidity sensor 242, and gas sensor 244. The alarms can be heard out by means of headphones 248 which are removably connected to alarm generator (speaker) 246 or alarm unit 236. The alarms can be discriminated by, for example, differences in loudness or intermission period of sound. If the speaker is attached to the distal end of guide tube 16, alarm unit 236 is provided with a circuit for the speaker, and input microphone 250 is attached to headphones 248. Also, portable alarm unit 236 is provided with input/output changeover switches 252 for the sensors and the like. Thus, operator 234 can obtain necessary information by selecting switches 252 corresponding thereto, while looking into borescope 10 for observation. Alarm unit 236 is further provided with indicator 254 for indicating the levels of measured values, independent of the acoustic alarms from alarm generator (speaker) 246 and headphones 248.

Also, hand microphone 256 removably connected to portable alarm unit 236 can be used for a direct address.

Furthermore, information irrelevant to input/output changeover switches 252 can be easily obtained if another sensor 245 is attached to the distal end of guide tube 16 with sensors.

Rotatory force transmission device 26 shown in FIG. 14 is provided with pump 260, air compressor 262, and vacuum unit 264. Pump 260 draws up clean water to be used to wash out stains from the distal end portion of insertion section 12 of borescope 10. Compressor 262 supplies compressed air to be used to blow away dust and other dry dirt. All or some of these elements can be used simultaneously by selectively operating remote control switches 266.

In the first and second embodiments described above, borescope 10 is in the form of a fiberscope. Alternatively, however, it may be formed of an electroscope which uses a solid-state image sensing device as observation means.

Figure 15:
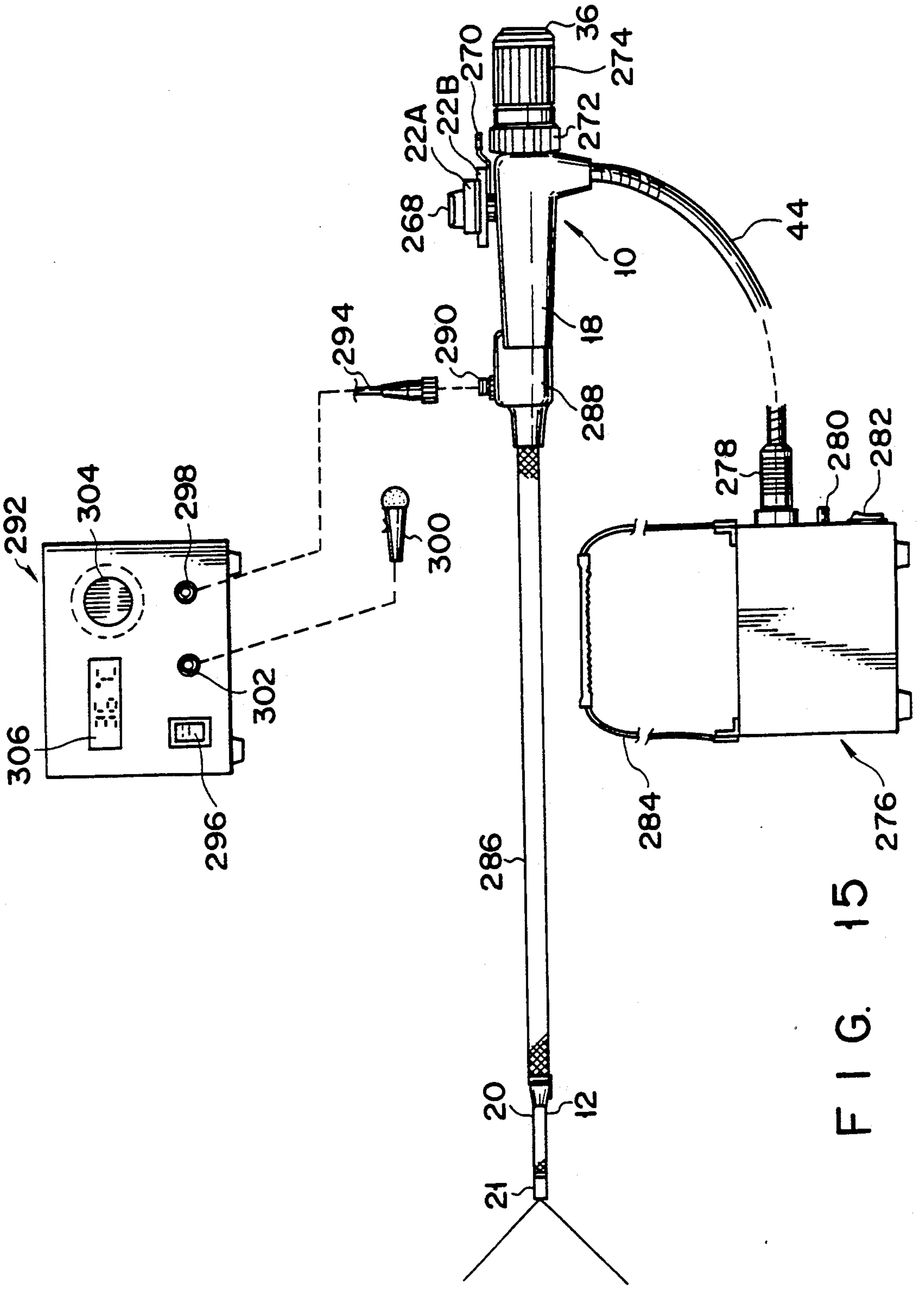
FIG. 15, is a side view schematically showing the general arrangement of a borescope system according to a third embodiment of the invention.
Figure 16:
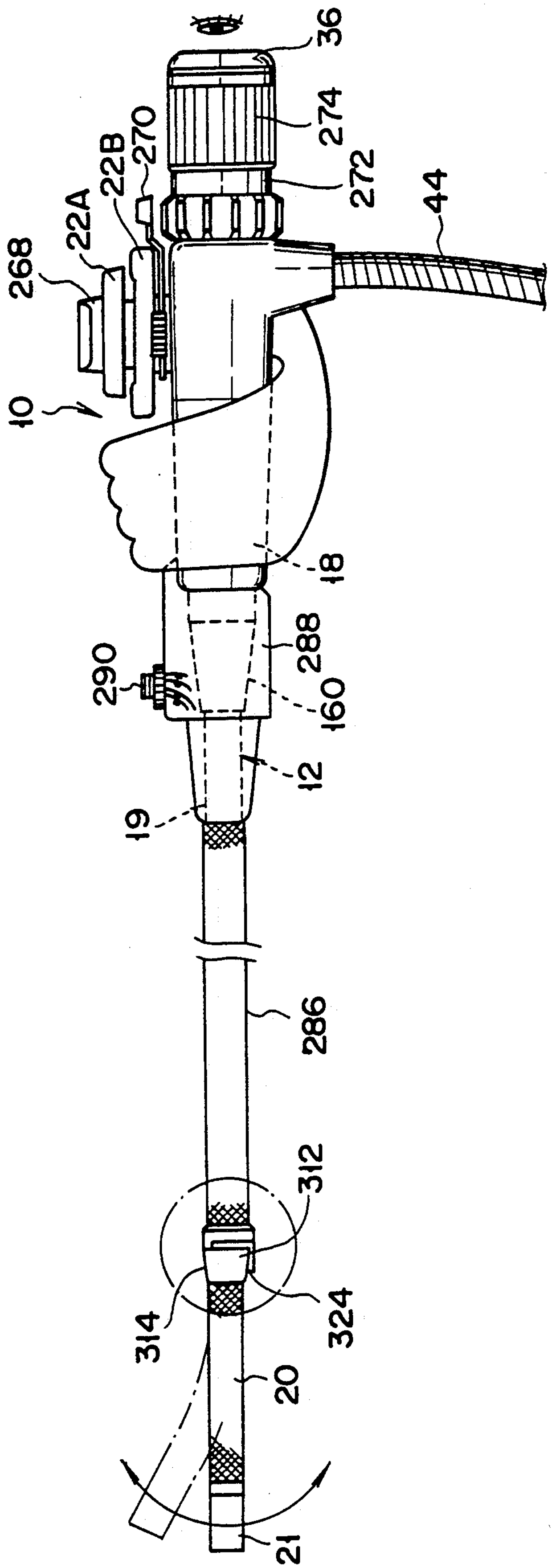
FIG. 16 is a side view of a borescope according to the third embodiment.
Figure 17:
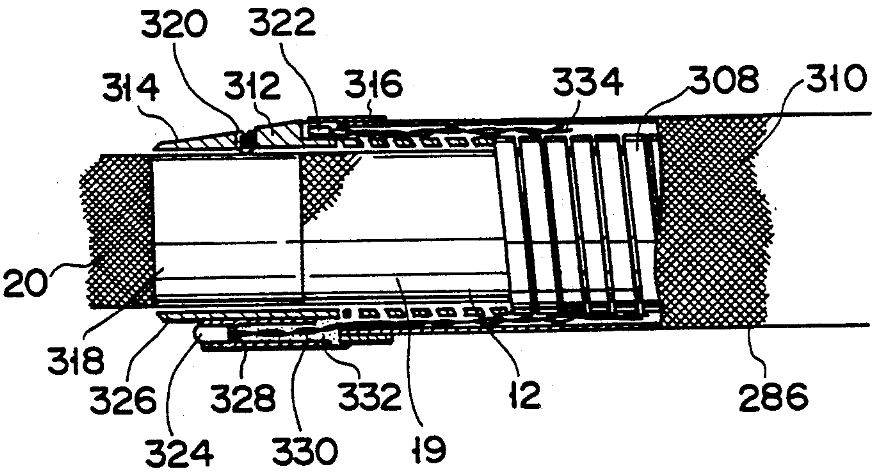
FIG. 17 is a partial sectional view of an armored tube according to the third embodiment.

FIGS. 15, 16 and 17 show a third embodiment of the present invention. FIG. 15 shows the general arrangement of a borescope system according to the third embodiment. Borescope 10 comprises manual control section 18 and insertion section 12. In insertion section 12, distal end portion 21 is coupled to the distal end of flexible tube portion 19 by means of bending portion 20. Bending portion 20 can be bent horizontally and vertically by operating horizontal and vertical bending knobs 22A and 22B, respectively, provided at control section 18. Knobs 22A and 22B can be released or fixed by means of separate free-engagement rings 268 and 270, respectively. Control section 18 includes eyepiece portion 36, which is provided with focusing ring 272 and correction ring 274. Light cable 44 extends from control section 18. Connector 278, which is attached to the free end of cable 44, is removably connected to light source unit 276 for illumination.

Light source unit 276 is provided with light adjustment knob 280 and power switch 282. Also, belt 284 for shoulder suspension is attached to unit 276. Thus, the light source unit can be suspended from the operator's shoulder as it is carried or operated.

Rear body 288 of sheathed tube 286 is mounted on the distal end portion of manual control section 18. Body 288 is fitted with electrical socket 290, to which is removably connected one end of cord 294 the other end of which is connected to external device 292. The external device is provided with power switch 296, cord socket 298, microphone socket 302 for microphone 300, speaker 304, and temperature indicator 306.

Sheathed tube 286 is attached to insertion section 12 of borescope 10. In tube 286, as shown in FIG. 17, metallic coil 308 is coated with protective blade 310 formed of stainless-steel strands. Coil 308 is not essential when tube 286 cannot be subjected to any substantial external force. Cylindrical distal end body 312 is mounted on the distal end of tube 286. The outer peripheral surface of the end portion of body 312 is tapered, thus forming guide surface 314 to facilitate insertion into boring guide tube 8.

Coil 308 and blade 310 of sheathed tube 286 are connected to the rear end portion of distal end body 312, and blade fixing cylinder 316 is fitted on the distal end of blade 310. Body 312 is fixed on the outer peripheral surface of insertion section 12 of borescope 10, especially on rigid connecting portion 318 between flexible tube portion 19 and bending portion 20, by means of setscrew 320.

Various sensors are attached to distal end body 312. They include microphone 322, temperature sensor 324, and subminiature speaker (not shown) provided on the same peripheral surface as the microphone. Microphone 322, which is of a subminiature type, is housed in a groove on the outer peripheral wall of the rear end portion of body 312. The microphone is covered by cylinder 316. Temperature sensor 324 is housed in groove 326 which is formed on the outer peripheral wall of the distal end portion of body 312. Sensor 324 is protected by means of cylindrical sensor cover 328 so that its distal end portion projects from a distal end opening of cover 328. Lead wires 330 of temperature sensor 324 are guided to the proximal portion of sheathed tube 286 through the space inside sensor cover 328 and the gap between coil 308 and blade 310 of tube 286. The space inside cover 328 and an extra space of groove 326 are sealed by means of adiabatic material 332. The inner surface of sensor cover 328 may be coated for heat insulation. Meanwhile, lead wires 334 of microphone 322 are also guided to the proximal portion of sheathed tube 286 through the gap between coil 308 and blade 310 of tube 286.

Cylindrical rear end body 288 is mounted on the rear end portion of sheathed tube 286. As shown in FIG. 16, it is fixed to guard tube 160 which is disposed between the distal end portion of manual control section 18 and the proximal end portion of insertion section 12 of borescope 10. Lead wires 330 and 334 are connected to electrical socket 290 which is attached to rear end body 288, as mentioned before.

In operating the system of this embodiment, sheathed tube 286 is attached to insertion section 12 of borescope 10, as shown in FIG. 15. In this state, borescope 10 is introduced into insertion passage 14 of boring guide tube 8 in the same manner as in case of the first embodiment. Borescope 10 is used to visually inspect a place to which a victim or victims are supposed to be confined. At the same time, microphone 322 and temperature sensor 324 are used to detect sounds or voices and the temperature in the place. The sounds or voices are caused to be delivered through speaker 304 of external device 292. The temperature is indicated on temperature indicator 306 of device 292.

Figure 18:
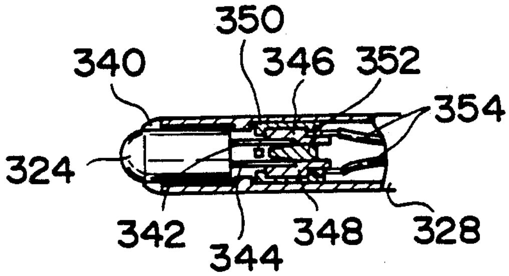
FIG. 18 is a partial sectional view showing a modification of a mounting portion of a temperature sensor shown in FIG. 17.

FIG. 18 shows a modification of temperature sensor 324 according to the third embodiment. In this modification, the temperature sensor is detachable. More specifically, sensor 324 is adapted to be inserted into the distal end portion of cylindrical sensor cover 328, and is sealed by means of seal material 340, such as silicone rubber. Temperature sensor 324 includes two lead pins 342 and 344, which are connected electrically to a pair of terminals 346 and 348, respectively, located inside sensor cover 328. Terminals 346 and 348 are enclosed by electrically insulating cover 350, and electrically insulating insert member 352 is interposed between the terminals. Thus, terminals 346 and 348 are electrically isolated from each other. Lead pins 342 and 344 of temperature sensor 324 are held between terminals 346 and 348 and insert member 352. Lead wires 354, which are connected individually to terminals 346 and 348, are guided to the proximal end portion of sheathed tube 286.

Held in position in this manner, temperature sensor 324 can be replaced with ease. It can be easily drawn out after seal material 340 is torn off. After a new temperature sensor is mounted, the seal material may be used again for sealing.

In the modification described above, only temperature sensor 324 is replaceable. Alternatively, however, other sensors or a subminiature speaker may be also designed for replacement.

When using the subminiature speaker, a human voice to be delivered through the speaker may be converted into a far-reaching high-frequency sound by means of an oscillator. If this is done, the victim or survivor can hear the voice despite the distance from the speaker.

Figure 19:
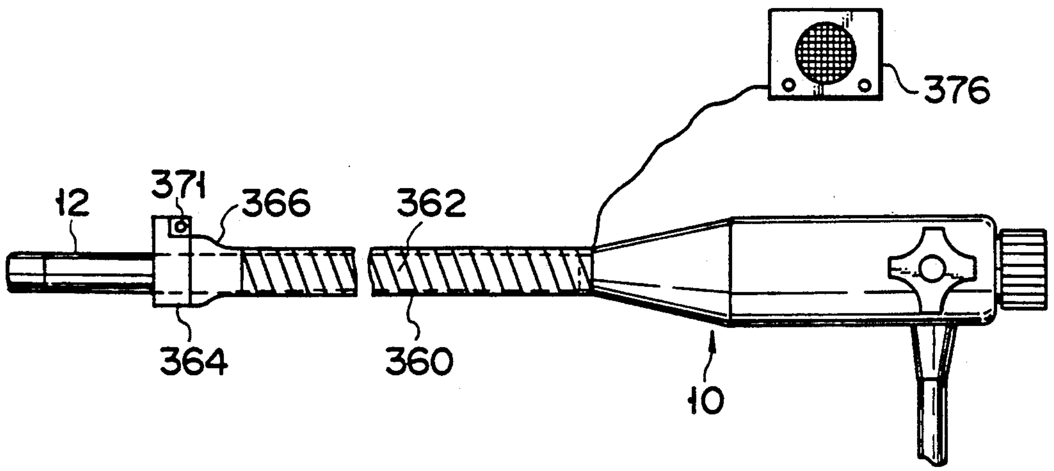
FIG. 19 is a side view schematically showing a borescope system according to a fourth embodiment of the invention.
Figure 20:
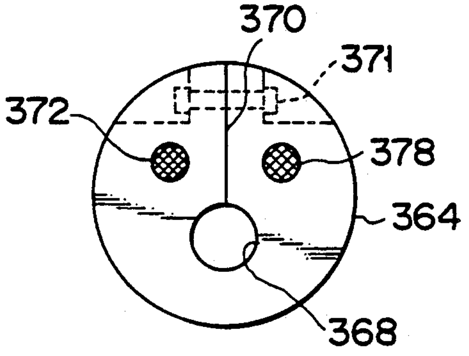
FIGS. 20 and 21 are a front view and a cutaway side view, respectively, of a distal adapter body shown in FIG. 19.
Figure 21:
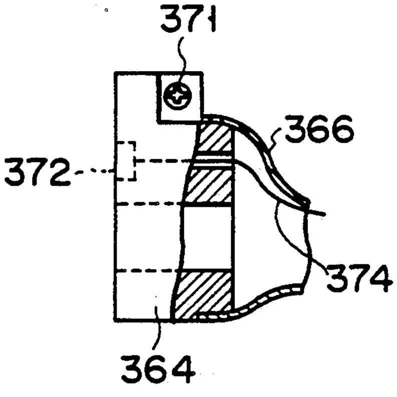

FIGS. 19, 20 and 21 show a fourth embodiment of the present invention. In this embodiment, adapter 360 is removably mounted on the outer peripheral surface of insertion section 12 of borescope 10. The adapter includes flexible spiral tube 362 and distal adapter body 364 attached to the distal end of tube 362. Tube 362 and body 364 are coupled to each other by means of thermally shrinkable tube 366. Adapter body 364 has insertion hole 368, through which insertion section 12 of borescope 10 is passed, and slit 370 on one side thereof. Fixing screw 371 penetrates and clamps that portion of body 364 which faces slit 370. Thus, distal adapter body 364 can be fitted tight on insertion section 12 of commercially available borescope 10.

As shown in FIG. 20, moreover, microphone 372 for use as a sensor is provided on the front face portion of distal adapter body 364. Cord 374, which is connected to microphone 372, is guided to the proximal end portion of spiral tube 362 through the space inside the spiral tube, and is then connected to external speaker system 376. Thus, voices detected by means of microphone 372 can be heard from system 376.

Further, miniature speaker 378 is provided side by side with microphone 372, on the front face portion of distal adapter body 364. Speaker 378 is connected to an external microphone for conversation by means of a cord (not shown).

With use of the borescope system according to this embodiment, the inside of a building collapsed by an earthquake or the like can be observed through borescope 10, and a survivor's voices, including moans, can be detected by means of microphone 372 and heard through external speaker system 376. Also, the victim can be addressed by means of miniature speaker 378 attached to distal adapter body 364. Thus, the survival of the victim can be ascertained, and the survivor can be encouraged from the outside.

Some other sensors, such as a temperature sensor, humidity sensor, gas sensor, etc., may be attached to distal adapter body 364.

FIGS. 22 and 23 show a fifth embodiment of the present invention. In boring guide tube 8 of this embodiment, the distal end of spiral coil 60 is connectedly fitted on the rear end portion of distal excavation tip 62, and is pressed by means of fixing member 382. Further, the distal end of coil 60 is fixed by brazing through brazing hole 384 in fixture 382. Also, brazing and screwing may be combined to fix the coil end. Fixture 382 is fixed to the rear end portion of tip 62 by means of setscrew 386.

Shutter 388 is attached to the distal end portion of distal excavation tip 62, whereby the distal end opening of the tip is normally closed. The shutter serves to prevent earth or sand from entering the distal end portion. A proximal cylinder portion of shutter 388 is held by means of retaining tube 390. Tube 390 is fixed to distal excavation tip 62 by means of setscrew 392. As shown in FIG. 23, a plurality of slits 394 are formed in a distal spreadable portion of shutter 388. Thus, when guide tube 16 with sensors or insertion section 12 of borescope 10 is inserted into excavation tip 62, it pushes open and penetrates the closing portions of shutter 388 by its thrusting force. A plurality of edges 28 are formed on the distal end portion of distal excavation tip 62. Groove 398 is defined between each two adjacent edges 28.

Cylindrical rear connector 80 is attached to the proximal end of spiral coil 60 of boring guide tube 8. The proximal end portion of spiral coil 60, like the distal end portion thereof, is fixed to connector 80 by means of fixture 383 and by brazing. A plurality of retaining pins 400, e.g., two in number, protrude from the outer peripheral surface of the rear end of rear connector 80, thus forming engaging portion 404 to be coupled to rotatory force transmission device 26. The rotatory force is transmitted from connector 80 to the distal end portion, whereby boring guide tube 8 can be rotated. To attain this, spiral coil 60 is made rigid enough to be able to transmit the rotatory force. Boring guide tubes of various lengths are prepared for selective use, depending on the conditions of the scenes of disasters.

Rotatory force transmission device 26 is constructed as shown in FIG. 22. Bearing 408 is mounted on the upper end of post 406, and rotating shaft 410 is supported by the bearing. Shaft 410, which is in the form of a hollow cylinder, has insertion hole 412 through which insertion section 12 of borescope 10 or the like is passed. Ring-shaped projection 414 is formed on the outer peripheral surface of one end of shaft 410. Projection 414 is held between one end of bearing 408 and stopper tube 418, to be prevented thereby from moving in the axial direction. Stopper tube 418 is screwed to outer cylinder 416 which is fitted on the one end portion of bearing 408.

Coupling retainer 420, formed of a cylindrical member, is fitted on the distal end of rotating shaft 410. It is fixed to shaft 410 by means of setscrew 422. A plurality of engaging grooves 424 are formed on the inner peripheral surface of the distal end portion of retainer 420. They correspond to and are adapted to engage retaining pins 400 of rear connector 80 of boring guide tube 8, individually. Thus, the rear end portion of connector 80 can be fitted into the distal end portion of retainer 420 so that pins 400 engage their corresponding grooves 424. In this manner, boring guide tube 8 and rotatory force transmission device 26 can be coupled to each other.

Rotating handle 426 is removably coupled to the rear end portion of rotating shaft 410 of rotatory force transmission device 26. In this handle, grip portion 434 is attached to arm 432, which is connected to attachment ring 430. Ring 430 is a cylindrical member which is adapted to be fitted on rear end portion 428 of shaft 410. Grip portion 434 is rotatably mounted so as to extend parallel to the axial direction of shaft 410. Coupling means for coupling attachment ring 430 to the rear end portion of shaft 410 is constructed in the same manner as the coupling means for rear connector 80 of boring guide tube 8 and coupling retainer 420. More specifically, a pair of retaining pins 436 are formed on the outer peripheral surface of the rear end portion of rotating shaft 410, while engaging grooves 438 are formed on the inner peripheral surface of ring 430 which is adapted to be fitted on the rear end portion of shaft 410. The proximal end portion of arm 432 is fastened to the rear end of attachment ring 430 by means of retaining nut 442 so that irregular fitting portion 439 at the rear end of ring 430 is fitted in irregular fitting hole 440 of arm 432. Further, ring 430 is formed with through hole 444 which communicates with hole 412 of shaft 410. Thus, insertion section 12 of borescope 10 or the like can be inserted through hole 444.

Post 406 has horizontally rotatable U-shaped fitting 446 at its top portion. Bearing 408 is mounted on fitting 446 by means of transverse support shaft 448, so as to be vertically rockable. Grounding post 450 is telescopically coupled to the lower end portion of post 406. It can be fixed in an extended position by means of clamping ring 452. Grounding sphere 454 is formed at the lower end portion of post 450, and projection 45 protrudes from the bottom of the sphere.

In operating rotatory force transmission device 26, rotating shaft 410 is first coupled to rear connector 80 of boring guide tube 8 by means of coupling retainer 420. More specifically, retaining pins of connector 80 are inserted individually into retaining grooves 424 of retainer 420. Rotating handle 426 is attached to the rear end of rotating shaft 410. Then, handle 426 is manually rotated by its grip portion 434. As a result, a rotatory force is transmitted through shaft 410 to guide tube 8, thereby rotating tube 8. While guide tube 8 is rotating in this manner, post 406 is pushed down forward to press tube 8. Thereupon, distal excavation tip 62 can advance digging or boring the landslide or members of the collapsed house. Excavation can be performed more efficiently if earth or sand in guide tube 8 is removed by suction with use of a vacuum (not shown), while operating rotatory force transmission device 26.

If the circumstances do not permit the use of post 406, handle 426 may be connected directly to engaging portion 404 of boring guide tube 8. If human strength is no match for the object to be excavated, it is necessary only to use a rotatory force transmission device which includes electric, pneumatic, or hydraulic power drive means.

Insertion section 12 of borescope 10 is inserted into the scene through penetrated boring guide tube 8, whereby the physical conditions of victim 6 and the surroundings are examined. Guide tube 8 can be also used for gas or water feed. For example, it can be used to supply oxygen, in case of oxygen starvation, or exclude filthy water and the like.

What is claimed is:

1. A lifesaving borescope system, comprising:

a borescope having an insertion section with a distal end portion;

detecting means including a sensor, disposed in the vicinity of the distal end portion of said insertion section, for detecting information;

sensor holding means for holding said sensor, including a guide tube having a guide passage through which the insertion section of said borescope is inserted and guided, and attachment means for attaching said guide tube to and detaching said guide tube from said borescope; and external output means for displaying or pronouncing the information detected by said detecting means;

wherein said borescope has a guide tube engaging portion, and said attachment means of the guide tube includes a resilient engaging piece provided at the rear end portion of the guide tube and adapted to engage the guide tube engaging portion of the borescope, and clamping means for clamping the engaging piece to the guide tube engaging portion and maintaining a clamping state therebetween.

2. A lifesaving borescope system, comprising:

a borescope having an insertion section with a distal end portion;

detecting means including a sensor, disposed in the vicinity of the distal end portion of said insertion section, for detecting information;

sensor holding means for holding said sensor, including a guide tube having a guide passage through which the insertion section of said borescope is inserted and guided to a distal end of the guide tube, said sensor being attached to the distal end of the guide tube so that when said distal end of said guide tube is brought to a desired position, conditions around said desired position can be observed through said borescope and associated information can be detected by said sensor, and attachment means for attaching said guide tube to and detaching said guide tube from said borescope; and external output means for displaying or pronouncing the information detected by said detecting means.

3. The borescope system according to claim 2, wherein said detecting means includes a sensor attached to the distal end portion of the guide tube, and transmission means disposed along the guide tube and adapted to transmit a detection signal from the sensor to the external output means.

4. The borescope system according to claim 3, wherein said sensor includes a microphone, and said external output means includes a speaker system.

5. The borescope system according to claim 3, wherein said guide tube includes connecting means for electrically connecting said sensor to said transmission means, and said sensor is detachably connectable to said connecting means.

6. A lifesaving borescope system, comprising:

a borescope having an insertion section with a distal end portion;

detecting means including a sensor, disposed in the vicinity of the distal end portion of said insertion section, for detecting information;

sensor holding means for holding said sensor, including a guide tube having a guide passage through which the insertion section of said borescope is inserted and guided, and attachment means for attaching said guide tube to and detaching said guide tube from said borescope;

external output means for displaying or pronouncing the information detected by said detecting means; and said guide tube comprising a boring tube assembly including a distal end portion having a cutting edge, a proximal end portion having a coupling portion, and a tube body having a passage through which the insertion section of the borescope is passed and guided, said tube body having flexibility in a bending direction and rigidity in a rotating direction, and being capable of transmitting a rotatory force from the proximal end portion to the distal end portion.

7. The borescope system according to claim 6, further comprising rotatory force generating means for rotating the boring tube assembly, said rotary force generating means including a rotary force transmission shaft adapted to be removably coupled to the coupling portion of the boring tube assembly, a rotatory force generator connected to the rotatory force transmission shaft, and having a through hole dimensioned to allow the borescope to be inserted therethrough when coupling the rotatory force transmission shaft to the coupling portion of the boring tube assembly.

8. The borescope system according to claim 6, further comprising fluid supply/discharge means for supplying and discharging a fluid through the passage of the boring tube assembly.

9. The borescope system according to claim 8, wherein said boring tube assembly is provided, at the proximal end portion thereof, with a joint removably connected with the fluid supply/discharge means.

10. A lifesaving borescope system, comprising:

a borescope having an insertion section with a distal end portion;

detecting means including a sensor, disposed in the vicinity of the distal end portion of said insertion section, for detecting information;

sensor holding means for holding said sensor;

external output means for displaying or pronouncing the information detected by said detecting means; and a boring tube assembly including a distal end portion having a cutting edge, a proximal end portion having a coupling portion, and a tube body having a passage through which the distal end portion of the insertion section of the borescope is inserted and guided to reach a desired position, said tube body having flexibility in a bending direction and rigidity in a rotating direction, and being capable of transmitting a rotatory force from the proximal end portion to the cutting edge at the distal end portion of the boring tube assembly.

11. A lifesaving borescope system, comprising:

a borescope having an insertion section with a distal end portion;

detecting means including a sensor, disposed in the vicinity of the distal end portion of said insertion section, for detecting information;

sensor holding means for holding said sensor, including a guide tube having a guide passage through which the insertion section of said borescope is inserted and guided, and attachment means for attaching said guide tube to and detaching said guide tube from said borescope; and external output means for displaying or pronouncing the information detected by said detecting means;

said borescope having a guide tube engaging portion, and said attachment means of the guide tube including a resilient engaging piece provided at a rear end portion of the guide tube and adapted to engage the guide tube engaging portion of the borescope, and clamping means for clamping the engaging piece to the guide tube engaging portion and maintaining a clamping state therebetween.

12. A lifesaving borescope system, comprising:

a borescope having an insertion section with a distal end portion;

detecting means including a sensor, disposed in the vicinity of the distal end portion of said insertion section, for detecting information;

sensor holding means for holding said sensor;

external output means for displaying or pronouncing the information detected by said detecting means;

a boring tube assembly including a distal end portion having a cutting edge, a proximal end portion having a coupling portion, and a tube body having a passage through which the insertion section of the borescope is inserted and guided, said tube body having flexibility in a bending direction and rigidity in a rotating direction, and being capable of transmitting a rotatory force from the proximal end portion to the distal end portion; and fluid supply/discharge means for supplying and discharging a fluid through the passage of the boring tube assembly.

13. The borescope system according to claim 12, wherein said boring tube assembly is provided at its proximal end portion with a joint removably connected with said fluid supply/discharge means.

* * * * *